United States Patent [19]

Duncan

[11] 4,414,772
[45] Nov. 15, 1983

[54] TOP WATER FISHING LURE

[76] Inventor: Samuel E. Duncan, 1514 Hidden Hills, Clinton, Tenn. 37716

[21] Appl. No.: 274,725

[22] Filed: Jul. 2, 1981

[51] Int. Cl.³ .................... A01K 85/00; A01K 83/06
[52] U.S. Cl. .................. 43/42.36; 43/42.29; 43/42.45
[58] Field of Search ............... 43/42.45, 42.48, 42.22, 43/42.28, 42.29, 42.08, 42.36

[56] References Cited

U.S. PATENT DOCUMENTS

| 1,701,528 | 2/1929 | Clewell | 43/42.28 |
| 2,036,954 | 4/1936 | Murray | 43/42.48 |
| 2,243,663 | 5/1941 | Warehan | 43/42.36 |
| 2,295,292 | 9/1942 | Rogers | 43/42.36 |
| 2,563,282 | 8/1951 | Schenck | 43/42.36 |
| 2,581,485 | 1/1952 | Herkenham | 43/42.48 |
| 2,690,026 | 9/1954 | King | 43/42.02 |
| 3,037,316 | 6/1962 | De Zeeuw | 43/42.28 |
| 3,104,486 | 9/1963 | Gressard | 43/42.48 |
| 3,120,074 | 2/1964 | Messler | 43/42.28 |
| 3,349,513 | 10/1967 | Jeff | 43/42.02 |
| 3,483,651 | 12/1969 | Borger | 43/42.48 |
| 3,731,419 | 5/1973 | Candy | 43/42.28 |
| 3,740,891 | 6/1973 | Rubenstein | 43/42.02 |
| 3,979,853 | 9/1976 | Storm | 43/42.29 |
| 4,215,506 | 8/1980 | Le Boeuf | 43/42.28 |

Primary Examiner—Nicholas P. Godici
Assistant Examiner—Marc Hodak
Attorney, Agent, or Firm—Herman L. Holsopple

[57] ABSTRACT

A top water fishing lure having a keeled and buoyant head expressly designed to represent a snake or lizard, and which buoyant head is adapted to receive at the posterior end thereof commercial dressings such as plastic grubs, pork rind and plastic skirts. The invention may be selectively weighted whereby, on retrieval, the lure assumes any desired angle between 10° and 45° to the horizontal and which thereby, from the combination of factors of said angle, the surface appearance and shape of the buoyant head, and the motion of the posterior commercial dressing, simulates the natural swimming movement and appearance of a live snake, lizard, eel, frog or minnow.

2 Claims, 7 Drawing Figures

TOP WATER FISHING LURE

BACKGROUND OF THE INVENTION

Fisherman, in general, and game and bass fishermen, in particular, have long known of the propensity of many species of fish for snakes, eels and lizards. As a consequence, in the past, attempts have been made to develop artificial bait which simulates the appearance and motion of snakes or snake-like creatures as closely as possible.

Among patents which utilize the appearance of snake-like fish lures are U.S. Pat. No. 1,701,528 which provides for a lure having a snake-shaped head with a swivel connection to a body having a helical spiral form; U.S. Pat. No. 2,690,026 in which the lure is comprised of an elongated rubber body shaped to resemble a snake; and U.S. Pat. No. 3,740,891 which provides for a leader bait such as a fish being pursued by a follower bait such as a snake. None of the foregoing lures have the life-like feature of a snake actually swimming with only his head breaking the surface of the water.

Other improvements in artificial bait are shown in U.S. Pat. No. 3,037,316 which describes a lure having a corkscrew tail which coils and uncoils with a whipping action but which assumes a slightly nose-down attitude; in U.S. Pat. No. 3,349,513 which shows an elongated, resilient, flexible fishing lure having the general appearance of an earthworm or snake; and in U.S. Pat. No. 3,731,419 which describes a one piece spoon to which a trailing plastic bait is attached. The aforementioned prior patents are cited for background information only.

OBJECTIVES OF THE INVENTION

It is, therefore, the primary object of this invention to provide a buoyant fishing lure resembling a snake or lizard for use by sport or game fishermen which, on retrieval, will glide at an angle to the water's surface and which will simulate the natural swimming motion of a snake, eel or other water reptile.

It is a further object of the invention to provide a fishing lure having a keeled and buoyant head and which has no moving mechanical parts but which, on retrieval, will move directly in a straight line toward the retriever.

It is still another object of the invention to provide a top water fishing lure which can be adapted to receive at the posterior end thereof any number of commercial dressings, some examples of which are pork rinds, plastic grubs and plastic skirts.

It is a still further object of the invention to provide a top surface fishing lure representing a snake, eel or other water reptile which may be selectively weighted whereby, on retrieval, the lure will assume a predetermined angle between 10° and 45° with the horizontal.

Further features and objectives of the invention will become apparent on an examination of the accompanying specifications and drawings wherein like numbers refer to like parts throughout, and which will assist in explaining the invention.

DESCRIPTION OF THE PREFERRED EMBODIMENT

Figure 1:
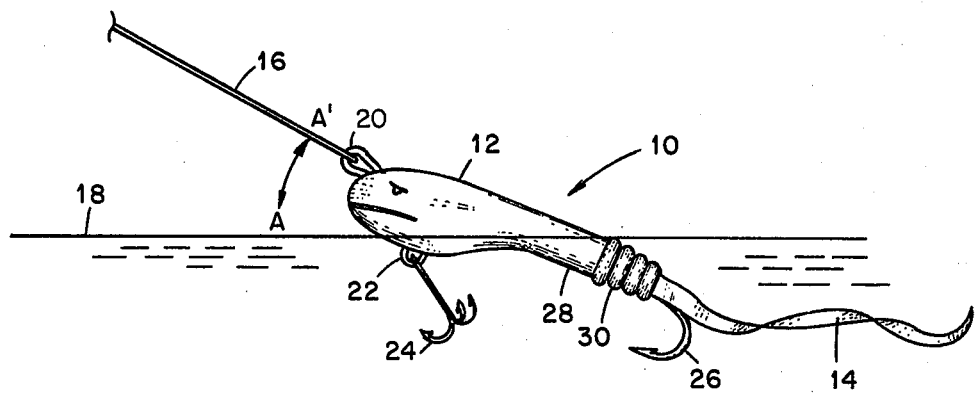
FIG. 1 is a side view of the subject invention showing the manner in which the buoyant head portion and non-floating tail portion of the lure achieve the desired angle on retrieval.

Referring now to the drawing of FIG. 1 wherein a side view of the subject fishing lure 10 having a buoyant head 12 and a non-floating tail portion 14 and being attached to a line 16 is shown as line 16 assumes the preferred angle of 10° to 45° (shown by arrows A–A') to the surface of water 18 for retrieval of said lure. The preferred angle is achieved when a fisherman reels in line 16 thereby causing lure 10 to move through the water toward said fisherman.

As seen in FIG. 1, line 16 is attached to said lure 10 by a first wire loop 20 placed in the anterior portion of lure 10. A second wire loop 22 depends beneath lure 10 whereby a first fishhook 24 is attached. A second fishhook 26 is attached at the posterior portion of lure 10.

Figure 2:
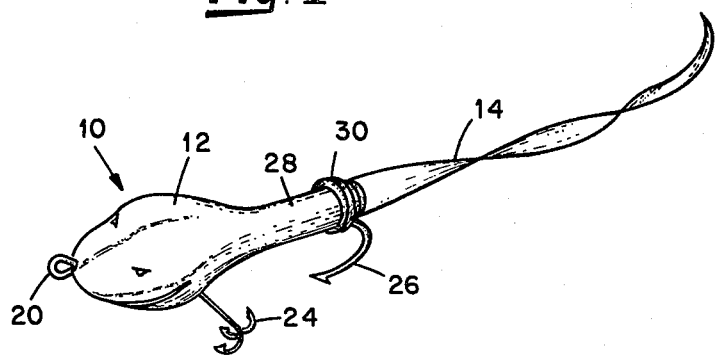
FIG. 2 is an isometric view of one embodiment of the subject invention showing, in general, the manner in which the several components are assembled.

FIG. 2 shows the embodiment of FIG. 1 from an isometric perspective whereby the viper or snake-like appearance of the subject lure can be perceived. As seen in FIG. 2, non-floating tail portion 14 comprises a plastic commercial dressing such as a plastic grub which is of a filamentous nature and which is mounted over and through fishhook 26 to the posterior portion 28 of lure 10 whereby, on retrieval, the lure simulates the appearance and motion of a live snake or lizard.

Figure 3:
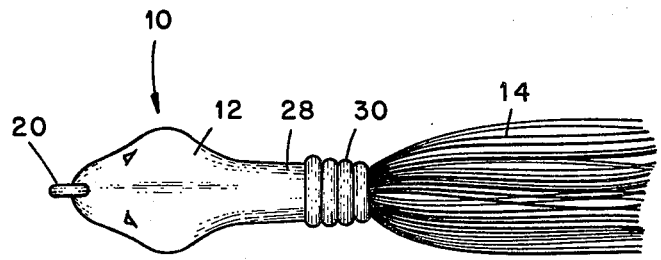
FIG. 3 is a top view of this new fishing lure.

FIG. 3 presents another embodiment of the invention as seen from above wherein non-floating tail portion 14 comprises a plastic skirt mounted to the posterior portion of lure 10 and whereby, on retrieval, motion is provided to said lure 10 for the purpose of attracting fish thereto.

In the preferred embodiment of the invention, buoyant head 12 is constructed of balsa wood or any non-corrodible composition material having a specific gravity less than that of water (1.0) whereby said substance will not sink beneath the surface of the lake, pond or river on which it is utilized.

The non-floating tail portion of the subject lure is preferably any one of several commercial plastic baits and can assume the shape or nature of such dressings as pork rinds, plastic grubs or skirts. These dressings generally comprise a larger anterior end 30 with a trailing filamentous tail portion 14 which provides a portion of the motion and action associated with the subject invention on retrieval. It is preferable, for more life-like action of the lure, that the posterior filamentous tail portion 14 be so positioned to buoyant head 12 that the terminal curved section thereof is turned upward when the lure is constructed.

Commercial dressings are utilized by simply piercing the large anterior end 30 thereof with a conventional fishhook 26 of appropriate size and sliding said anterior end 30 of tail portion 14 toward the posterior end 28 of lure 10. The posterior end 28 of lure 10 may be tapered for a streamlining effect when the anterior end 30 of tail portion 14 is slidably engaged therewith.

The manner in which the buoyant head of the subject lure is constructed can be seen in FIGS. 4, 5, 6 and 7. In the cross-sectional side view of FIG. 4 and top view of FIG. 5, it is seen that a first aperture 32 is drilled from top to bottom completely through lure 10 at a position somewhat forward of the mid-point thereof. A second aperture 34 is drilled partially through lure 10 to the rear of said first aperture 32. A groove 36 is machined or sawed along the anterior-posterior centerline at the top surface of lure 10 to a depth sufficient to accommodate wire 38 and the shank portion of fishhook 26.

Figure 7:
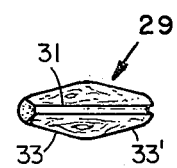
FIG. 7 is an enlarged cross-sectional view of the wooden bead used to frictionally hold in place the non-floating tail portion to the buoyant head portion of the subject fishing lure.

A wooden bead 29, seen in FIG. 7 in an enlargement, is positioned by means of a longitudinal slot along its length, to the rigid shank portion of fishhook 26 whereby the elasticity of plastic anterior end 30 of tail portion 14 causes said tail portion 14 to be frictionally held in place. It is important to the invention that the anterior and posterior ends of the wooden bead adjacent to the slot be tapered whereby the elasticity of plastic non-floating tail portion 14 allows said tail portion to be frictionally retained by the wooden bead 29. Non-floating tail portion 14 has a specific gravity greater than 1.0.

Figure 4:
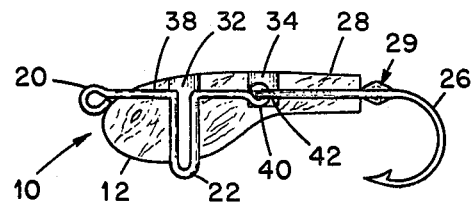
FIG. 4 is a cross-sectional side view of the invention showing the manner in which the parts are installed into the buoyant head portion of the lure.
Figure 5:
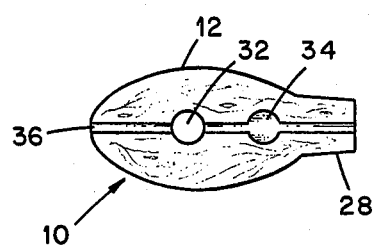
FIG. 5 is a cross-sectional top plan view showing the way in which the buoyant head portion is designed.

As seen in FIG. 4, first aperture 32 accommodates the portion of wire 38 shaped to provide access for second wire loop 22 while a second aperture 34 accommodates a looped end 40 of wire 38 to which the terminal shank end 42 of fishhook 26 is attached.

Figure 6:
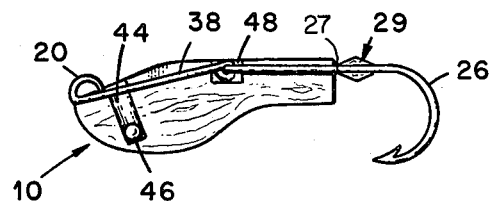
FIG. 6 is a cross-sectional side view of a second embodiment of the invention showing the manner in which the subject lure can be weighted to achieve proper balance.

The cross-sectional side view of FIG. 6 shows a second embodiment of lure 10 in which only a single fishhook 26 is utilized. In the embodiment of FIG. 6, a first aperture 44 located in the nose of lure 10 is provided with a pellet 46, preferably made of lead, and the weight of which may be preselected to predetermine the angle to the water at which said lure is to be retrieved. In practice, the heavier that pellet 46 is, the lower the nose of lure 10 drops, and the smaller the retrieval angle becomes.

A second aperture 48 in the lure of FIG. 6 is provided for a purpose similar to that of the second aperture 34 in FIG. 4, that is to provide a receptacle for the attachment of fishhook 26 to wire 38.

In the manufacture of the subject lure it is, of course, required that the aforementioned drilled or sawed out portions 32, 34, 36, 44, and 48 be replaced after assembly of the component parts with plastic or wood filler material whereby the lures may then be sanded or buffed smooth and painted.

It is understood that, in addition to the use of conventional fishhooks comprising the usual straight, rigid shank having an eye at one end thereof and a curvate or rounded single or multiple-barbed hook at the other end thereof, it is also common practice to use so-called weedless hooks with this invention. Such hooks comprise a looped wire construction over the point of the hook to prevent weeds or other debris from attaching thereto, yet has a spring action by which a fish can overcome the hook's protection.

Thus, in summary, a top water fishing lure is described having the life-like features of a snake swimming with only his head breaking the surface of the water. The invention, in its preferred embodiment, comprises a lure with a buoyant head adaptable to receive any non-floating commercial dressings which, in combination, provide a fish bait which, on retrieval at any desired speed and angle, simulates natural swimming reptilian creatures.

While the preferred embodiment of the invention utilizes a non-floating tail portion in combination with a buoyant head, it is obviously possible to attach floating tail portions to the buoyant head of the invention. When this is done, the lure would of course, assume a more horizontal attitude with respect to the surface of the water and would simulate reptilian or other creatures which swim on the water's surface.

A preferred embodiment of this invention has been set forth in the description and drawings. These descriptions are used in the generic sense only and not for purposes of limitation. Various changes may, therefore, be made therein without departing from the spirit and scope of the invention.

What is claimed is:

1. A top water fishing lure, comprising: a keeled and buoyant body portion, said body portion having an anterior end and a posterior end, said body portion having a first aperture extending downwardly through said anterior end thereof, said body portion having a second aperture extending downwardly partially through said body at a position posterior to said first aperture, and said body portion having a groove extending along the anterior-posterior centerline at the top surface of said body portion to connect said first and second apertures; a non-floating tail portion connected to said body portion at said posterior end thereof; a wire having a first loop disposed in said groove in the anterior portion of said body portion for receiving a fishing line, said wire having a second loop disposed in said first aperture and a third loop located in said second aperture; a first fishhook attached to said second loop disposed in said first aperture, a second fishhook attached to said third loop in said second aperture located at a position in said body portion posterior to said first aperture; and means disposed about the shank portion of said second fishhook for frictionally restraining a plastic dressing forming said tail portion onto the posterior end of said body portion, said lure having the general appearance of a reptilian creature.

2. The top water fishing lure of claim 1 wherein said means for frictionally restraining said plastic dressing forming said tail portion onto the posterior end of said body portion comprises a wooden bead disposed about said shank portion of said second fishhook, said wooden bead having tapered ends aligned with said shank portion so that the anterior end of said plastic dressing may be manually urged thereover and whereby said bead frictionally restrains said dressing thereon.

* * * * *